US009845106B2

(12) United States Patent
Bodtker et al.

(10) Patent No.: US 9,845,106 B2
(45) Date of Patent: Dec. 19, 2017

(54) OVERLOAD PROTECTION FOR BELT DRIVE MECHANISM

(71) Applicant: Steering Solutions IP Holding Corporation, Saginaw, MI (US)

(72) Inventors: Joen C. Bodtker, Gaines, MI (US); Eric D. Pattok, Frankenmuth, MI (US)

(73) Assignee: STEERING SOLUTIONS IP HOLDING CORPORATION, Saginaw, MI (US)

( * ) Notice: Subject to any disclaimer, the term of this patent is extended or adjusted under 35 U.S.C. 154(b) by 0 days.

(21) Appl. No.: 14/840,618

(22) Filed: Aug. 31, 2015

(65) Prior Publication Data

US 2017/0057541 A1 Mar. 2, 2017

(51) Int. Cl.
*B62D 1/20* (2006.01)
*B62D 1/16* (2006.01)

(52) U.S. Cl.
CPC ................. *B62D 1/20* (2013.01); *B62D 1/16* (2013.01)

(58) Field of Classification Search
CPC .................................... B62D 6/08; B62D 5/02
USPC ................ 180/405, 406, 407, 426, 444, 446
See application file for complete search history.

(56) References Cited

U.S. PATENT DOCUMENTS 4,315,117 A 2/1982 Kokubo et al.
4,337,967 A 7/1982 Yoshida et al.
4,503,300 A 3/1985 Lane, Jr.
4,503,504 A 3/1985 Suzumura et al.
4,561,323 A 12/1985 Stromberg
4,635,029 A 1/1987 Yamada
4,638,287 A 1/1987 Umebayashi
4,691,587 A 9/1987 Farrand et al.
4,766,326 A 8/1988 Hayashi et al.
4,836,566 A 6/1989 Birsching
4,921,066 A 5/1990 Conley
4,962,570 A 10/1990 Hosaka et al.
4,967,618 A 11/1990 Matsumoto et al.
4,976,239 A 12/1990 Hosaka
5,240,284 A 8/1993 Takada et al.
5,295,712 A 3/1994 Omura
5,319,803 A 6/1994 Allen
5,488,555 A 1/1996 Asgari et al.
(Continued)

FOREIGN PATENT DOCUMENTS

CN 1722030 A 1/2006
CN 1736786 A 2/2006
(Continued)

OTHER PUBLICATIONS

China Patent Application No. 201510204221.5 Second Office Action dated Mar. 10, 2017, 8 pages.
(Continued)

*Primary Examiner* — Tony H. Winner
*Assistant Examiner* — Marlon A Arce
(74) *Attorney, Agent, or Firm* — Cantor Colburn LLP

(57) ABSTRACT

An assembly includes a steering shaft and a primary drive system eccentrically coupled to the steering shaft and configured to transfer a torque applied to the steering shaft to a vehicle steering system. The assembly also includes a secondary drive system coupled to the steering shaft and configured to transfer the torque applied to the steering shaft if the primary drive system is inactive and substantially unable to transfer the torque.

16 Claims, 4 Drawing Sheets

(56) References Cited

U.S. PATENT DOCUMENTS 5,618,058 A 4/1997 Byon
5,668,721 A 9/1997 Chandy
5,690,362 A 11/1997 Peitsmeier et al.
5,765,116 A 6/1998 Wilson-Jones et al.
5,893,580 A 4/1999 Hoagland et al.
5,911,789 A 6/1999 Keipert et al.
6,070,686 A 6/2000 Pollmann
6,145,402 A 11/2000 Nishitani et al.
6,170,862 B1 1/2001 Hoagland et al.
6,227,571 B1 5/2001 Sheng et al.
6,354,622 B1 * 3/2002 Ulbrich ............... B60R 21/2037 280/728.2
6,360,149 B1 3/2002 Kwon et al.
6,373,472 B1 4/2002 Palalau et al.
6,381,526 B1 4/2002 Higashi et al.
6,390,505 B1 5/2002 Wilson
6,578,449 B1 6/2003 Anspaugh et al.
6,612,393 B2 * 9/2003 Bohner .................... B62D 5/06 180/402
6,819,990 B2 11/2004 Ichinose
7,021,416 B2 * 4/2006 Kapaan ................. B60W 30/18 180/405
7,048,305 B2 5/2006 Muller
7,062,365 B1 6/2006 Fei
7,295,904 B2 11/2007 Kanevsky et al.
7,308,964 B2 * 12/2007 Hara ...................... B62D 1/163 180/402
7,380,828 B2 6/2008 Menjak et al.
7,428,944 B2 * 9/2008 Gerum ................... B60K 25/02 180/405
7,461,863 B2 12/2008 Muller
7,495,584 B1 2/2009 Sorensen
7,628,244 B2 * 12/2009 Chino .................... B62D 1/163 180/402
7,690,685 B2 4/2010 Sasaoka
7,719,431 B2 5/2010 Bolourchi
7,735,405 B2 6/2010 Parks
7,793,980 B2 9/2010 Fong
7,862,079 B2 1/2011 Fukawatase et al.
7,894,951 B2 2/2011 Norris et al.
7,909,361 B2 3/2011 Oblizajek et al.
7,931,296 B2 4/2011 Choi
8,002,075 B2 8/2011 Markfort
8,027,767 B2 9/2011 Klein et al.
8,055,409 B2 11/2011 Tsuchiya
8,069,745 B2 12/2011 Strieter et al.
8,079,312 B2 12/2011 Long
8,146,945 B2 4/2012 Born et al.
8,170,725 B2 5/2012 Chin et al.
8,260,482 B1 9/2012 Szybalski et al.
8,352,110 B1 1/2013 Szybalski et al.
8,479,605 B2 * 7/2013 Shavrnoch ........... B62D 5/0448 180/443
8,548,667 B2 10/2013 Kaufmann
8,606,455 B2 12/2013 Boehringer et al.
8,634,980 B1 1/2014 Urmson et al.
8,650,982 B2 2/2014 Matsuno et al.
8,670,891 B1 3/2014 Szybalski et al.
8,695,750 B1 4/2014 Hammond et al.
8,818,608 B2 8/2014 Cullinane et al.
8,825,258 B2 9/2014 Cullinane et al.
8,825,261 B1 9/2014 Szybalski et al.
8,843,268 B2 9/2014 Lathrop et al.
8,874,301 B1 10/2014 Rao et al.
8,880,287 B2 11/2014 Lee et al.
8,881,861 B2 * 11/2014 Tojo ..................... B62D 5/0424 180/444
8,899,623 B2 12/2014 Stadler et al.
8,909,428 B1 12/2014 Lombrozo
8,948,993 B2 2/2015 Schulman et al.
8,950,543 B2 * 2/2015 Heo ......................... B62D 5/04 180/444
8,994,521 B2 3/2015 Gazit
9,002,563 B2 4/2015 Green et al.
9,031,729 B2 5/2015 Lathrop et al.
9,032,835 B2 * 5/2015 Davies ................... B62D 1/184 74/493
9,045,078 B2 6/2015 Tovar et al.
9,073,574 B2 7/2015 Cuddihy et al.
9,092,093 B2 7/2015 Jubner et al.
9,108,584 B2 8/2015 Rao et al.
9,134,729 B1 9/2015 Szybalski et al.
9,150,200 B2 10/2015 Urhahne
9,150,224 B2 10/2015 Yopp
9,164,619 B2 10/2015 Goodlein
9,174,642 B2 11/2015 Wimmer et al.
9,186,994 B2 11/2015 Okuyama et al.
9,193,375 B2 11/2015 Schramm et al.
9,199,553 B2 12/2015 Cuddihy et al.
9,227,531 B2 1/2016 Cuddihy et al.
9,233,638 B2 1/2016 Lisseman et al.
9,235,211 B2 1/2016 Davidsson et al.
9,235,987 B2 1/2016 Green et al.
9,238,409 B2 1/2016 Lathrop et al.
9,248,743 B2 2/2016 Enthaler et al.
9,260,130 B2 2/2016 Mizuno
9,290,174 B1 3/2016 Zagorski
9,290,201 B1 3/2016 Lombrozo
9,298,184 B2 3/2016 Bartels et al.
9,308,857 B2 4/2016 Lisseman et al.
9,308,891 B2 4/2016 Cudak et al.
9,333,983 B2 5/2016 Lathrop et al.
9,352,752 B2 5/2016 Cullinane et al.
9,360,865 B2 6/2016 Yopp
2002/0092696 A1 * 7/2002 Bohner .................... B62D 5/06 180/405
2003/0046012 A1 3/2003 Yamaguchi
2003/0094330 A1 5/2003 Boloorchi et al.
2003/0227159 A1 12/2003 Muller
2004/0016588 A1 1/2004 Vitale et al.
2004/0046346 A1 3/2004 Eki et al.
2004/0099468 A1 5/2004 Chernoff et al.
2004/0129098 A1 7/2004 Gayer et al.
2004/0204808 A1 10/2004 Satoh et al.
2004/0262063 A1 12/2004 Kaufmann et al.
2005/0001445 A1 1/2005 Ercolano
2005/0081675 A1 4/2005 Oshita et al.
2005/0197746 A1 9/2005 Pelchen et al.
2005/0275205 A1 12/2005 Ahnafield
2006/0224287 A1 10/2006 Izawa et al.
2006/0244251 A1 11/2006 Muller
2007/0021889 A1 1/2007 Tsuchiya
2007/0029771 A1 2/2007 Haglund et al.
2007/0046003 A1 3/2007 Mori et al.
2007/0046013 A1 3/2007 Bito
2007/0241548 A1 10/2007 Fong
2007/0284867 A1 12/2007 Cymbal et al.
2008/0009986 A1 1/2008 Lu et al.
2008/0238068 A1 10/2008 Kumar et al.
2008/0277178 A1 11/2008 Poli et al.
2009/0024278 A1 1/2009 Kondo et al.
2009/0256342 A1 10/2009 Cymbal et al.
2009/0276111 A1 11/2009 Wang et al.
2009/0292466 A1 11/2009 McCarthy et al.
2010/0152952 A1 6/2010 Lee et al.
2010/0222976 A1 9/2010 Haug
2010/0228417 A1 9/2010 Lee et al.
2010/0228438 A1 9/2010 Buerkle
2010/0280713 A1 11/2010 Stahlin et al.
2010/0286869 A1 11/2010 Katch et al.
2010/0288567 A1 11/2010 Bonne
2011/0098922 A1 4/2011 Ibrahim
2011/0153160 A1 6/2011 Hesseling et al.
2011/0167940 A1 7/2011 Shavrnoch et al.
2011/0187518 A1 8/2011 Strumolo et al.
2011/0266396 A1 11/2011 Abildgaard et al.
2011/0282550 A1 11/2011 Tada et al.
2012/0136540 A1 5/2012 Miller
2012/0205183 A1 8/2012 Rombold
2012/0209473 A1 8/2012 Birsching et al.
2012/0215377 A1 8/2012 Takemura et al.
2013/0002416 A1 1/2013 Gazit
2013/0087006 A1 4/2013 Ohtsubo et al.

(56) References Cited

U.S. PATENT DOCUMENTS

2013/0158771 A1 6/2013 Kaufmann
2013/0218396 A1 8/2013 Moshchuk et al.
2013/0233117 A1 9/2013 Read et al.
2013/0325202 A1 12/2013 Howard et al.
2014/0028008 A1 1/2014 Stadler et al.
2014/0046542 A1 2/2014 Kauffman et al.
2014/0046547 A1 2/2014 Kaufmann et al.
2014/0111324 A1 4/2014 Lisseman et al.
2014/0136055 A1 5/2014 Sugiyama
2014/0300479 A1 10/2014 Wolter et al.
2014/0309816 A1 10/2014 Stefan et al.
2015/0002404 A1 1/2015 Hooton
2015/0014086 A1 1/2015 Eisenbarth
2015/0032322 A1 1/2015 Wimmer
2015/0051780 A1 2/2015 Hahne
2015/0060185 A1 3/2015 Feguri
2015/0088357 A1 3/2015 Yopp
2015/0120142 A1 4/2015 Park et al.
2015/0210273 A1 7/2015 Kaufmann et al.
2015/0246673 A1 9/2015 Tseng et al.
2015/0251666 A1 9/2015 Attard et al.
2015/0283998 A1 10/2015 Lind et al.
2015/0324111 A1 11/2015 Jubner et al.
2016/0009311 A1 1/2016 Khale et al.
2016/0009332 A1 1/2016 Sirbu
2016/0075371 A1 3/2016 Varunkikar et al.
2016/0082867 A1 3/2016 Sugioka et al.
2016/0185387 A1 6/2016 Kuoch
2016/0200246 A1 7/2016 Lisseman et al.
2016/0200343 A1 7/2016 Lisseman et al.
2016/0200344 A1 7/2016 Sugioka et al.
2016/0207538 A1 7/2016 Urano et al.
2016/0209841 A1 7/2016 Yamaoka et al.
2016/0229450 A1 8/2016 Basting et al.
2016/0231743 A1 8/2016 Bendewald et al.
2016/0304123 A1 10/2016 Lewis et al.
2016/0318540 A1 11/2016 King
2016/0318542 A1 11/2016 Pattok et al.
2016/0347347 A1 12/2016 Lubischer
2016/0347348 A1 12/2016 Lubischer
2016/0362084 A1 12/2016 Martin et al.
2016/0362117 A1 12/2016 Kaufmann et al.
2016/0362126 A1 12/2016 Lubischer
2016/0368522 A1 12/2016 Lubischer
2016/0375860 A1 12/2016 Lubischer
2016/0375923 A1 12/2016 Schulz
2016/0375925 A1 12/2016 Lubischer et al.
2016/0375926 A1 12/2016 Lubischer et al.
2016/0375927 A1 12/2016 Schulz et al.
2016/0375928 A1 12/2016 Magnus
2016/0375929 A1 12/2016 Rouleau
2016/0375931 A1 12/2016 Lubischer
2017/0029009 A1 2/2017 Rouleau
2017/0029018 A1 2/2017 Lubischer
2017/0057541 A1 3/2017 Bodtker et al.
2017/0113712 A1 4/2017 Watz

FOREIGN PATENT DOCUMENTS

CN 101037117 A 9/2007
CN 101041355 A 9/2007
CN 101596903 A 12/2009
CN 102452391 A 5/2012
CN 103419840 A2 12/2013
DE 19523214 A1 1/1997
DE 19923012 A1 11/2000
DE 10212782 A1 10/2003
DE 102005032528 A1 1/2007
DE 102005056438 A1 6/2007
DE 102006025254 A1 12/2007
DE 102010025197 A1 12/2011
EP 1559630 A2 8/2005
EP 1783719 A2 5/2007
EP 1932745 A2 6/2008
EP 1990244 A1 11/2008
EP 2384946 A2 11/2011
EP 2426030 A1 3/2012
EP 2489577 A2 8/2012
EP 2604487 A1 6/2013
EP 1606149 B1 5/2014
FR 2862595 A1 5/2005
FR 3016327 A1 7/2015
JP H05162652 A 6/1993
JP 2004009989 A 1/2004
KR 20100063433 A 6/2010
WO 2006099483 A1 9/2006
WO 2010082394 A1 7/2010
WO 2010116518 A1 10/2010

OTHER PUBLICATIONS

CN Patent Application No. 201210599006.6 First Office Action dated Jan. 27, 2015, 9 pages.
CN Patent Application No. 201210599006.6 Second Office Action dated Aug. 5, 2015, 5 pages.
CN Patent Application No. 201310178012.9 First Office Action dated Apr. 13, 2015, 13 pages.
CN Patent Application No. 201310178012.9 Second Office Action dated Dec. 28, 2015, 11 pages.
CN Patent Application No. 201410089167 First Office Action and Search Report dated Feb. 3, 2016, 9 pages.
EP Application No. 14156903.8 Extended European Search Report, dated Jan. 27, 2015, 10 pages.
EP Application No. 14156903.8 Office Action dated Nov. 16, 2015, 4 pages.
EP Application No. 14156903.8 Office Action dated May 31, 2016, 5 pages.
EP Application No. 14156903.8 Partial European Search Report dated Sep. 23, 2014, 6 pages.
EP Application No. 15152834.6 Extended European Search Report dated Oct. 8, 2015, 7 pages.
European Application No. 12196665.9 Extended European Search Report dated Mar. 6, 2013, 7 pages.
European Search Report for European Application No. 13159950.8; dated Jun. 6, 2013; 7 pages.
European Search Report for related European Application No. 15152834.6, dated Oct. 8, 2015; 7 pages.
Gillespie, Thomas D.; "Fundamentals of Vehicle Dynamics"; Society of Automotive Enginers, Inc.; published 1992; 294 pages.
Kichun, et al.; "Development of Autonomous Car-Part II: A Case Study on the Implementation of an Autonomous Driving System Based on Distributed Architecture"; IEEE Transactions on Industrial Electronics, vol. 62, No. 8, Aug. 2015; 14 pages.
Office Action dated Aug. 29, 2016.
Partial European Search Report for related European Patent Application No. 14156903.8, dated Sep. 23, 2014, 6 pages.
Van der Jagt, Pim; "Prediction of Steering Efforts During Stationary or Slow Rolling Parking Maneuvers"; Ford Forschungszentrum Aachen GmbH.; Oct. 27, 1999; 20 pages.
Varunjikar, Tejas; Design of Horizontal Curves With DownGrades Using Low-Order Vehicle Dynamics Models; A Theisis by T. Varunkikar; 2011; 141 pages.

* cited by examiner

OVERLOAD PROTECTION FOR BELT DRIVE MECHANISM

FIELD OF THE INVENTION

The following description relates to steering column assemblies and, more specifically, to an overload protection system for a steering column assembly.

BACKGROUND

Some known steering columns may include a belt drive mechanism to allow eccentric attachment to a vehicle steering system. However, the belt drive mechanism may experience a failure mode if a belt of the belt drive mechanism is disabled or broken, which may result in loss of steering.

Accordingly, it is desirable to provide steering column having a flexible element drive mechanism with a secondary drive transmitting mechanism.

SUMMARY OF THE INVENTION

In an exemplary embodiment of the present invention, an eccentric power transfer system for a steering column assembly is provided. The power transfer system includes a primary drive system configured to transfer a torque applied to the steering column assembly to a vehicle steering system, and a secondary drive system configured to transfer the torque applied to the steering column when the primary drive system is inactive and unable to transfer the torque.

In another exemplary embodiment of the present invention, a steering column assembly for a vehicle is provided. The assembly includes a steering shaft and a primary drive system eccentrically coupled to the steering shaft and configured to transfer a torque applied to the steering shaft to a vehicle steering system. The assembly also includes a secondary drive system coupled to the steering shaft and configured to transfer the torque applied to the steering shaft if the primary drive system is inactive and substantially unable to transfer the torque.

In yet another exemplary embodiment of the invention, a method of assembling a steering column assembly for a vehicle is provided. The method comprises providing a steering shaft rotatable about an axis and eccentrically coupling a primary drive system to the steering shaft to transfer a torque applied to the steering shaft. A secondary drive system is coupled to the steering shaft to transfer the torque applied to the steering shaft if the primary drive system is inactive and substantially and unable to transfer the torque.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
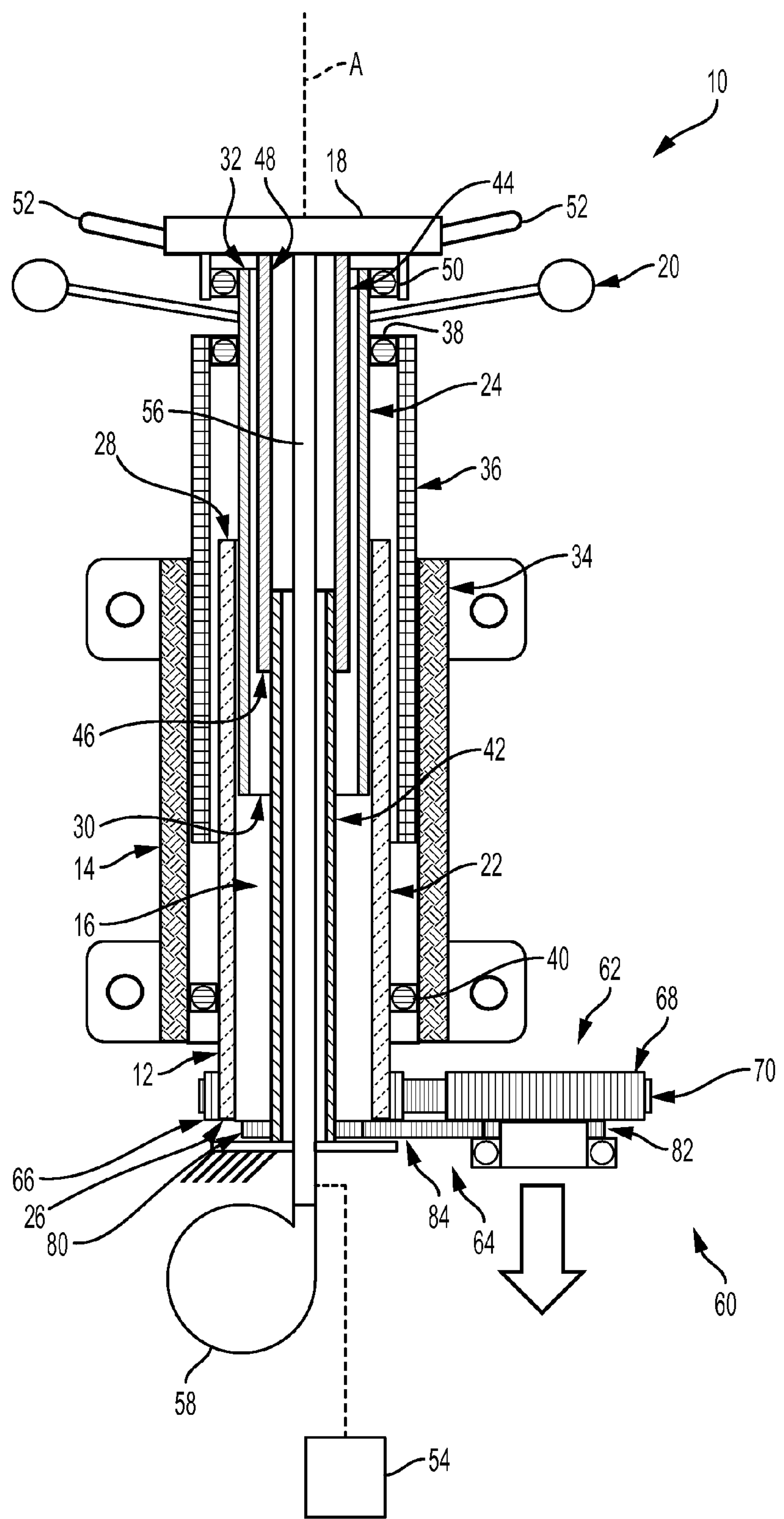
FIG. 1 illustrates an exemplary steering column assembly according to one embodiment of the disclosure.

Referring now to the Figures, where the invention will be described with reference to specific embodiments, without limiting same, FIG. 1 illustrates an exemplary steering column assembly 10 that generally includes a steering column shaft 12, a column jacket 14, a hub support 16, a stationary steering wheel hub 18, and a steering wheel rim 20. In an exemplary embodiment, steering column assembly 10 is adjustable in a rake direction and a telescope direction. The steering column assembly provides an eccentric power transfer system 60, 160 that translates rotation of the steering column shaft 12 eccentrically through the power transfer system 60, 160 to the vehicle steering gear system (not shown).

Steering shaft 12 extends along an axis ‘A’ and includes a lower shaft 22 and an upper shaft 24. Lower shaft 22 includes a first end 26 and an opposite second end 28. Upper shaft 24 includes a first end 30 and an opposite second end 32. Upper shaft first end 30 is disposed within lower shaft 22 such that upper shaft 24 is telescopically and slidingly disposed within lower shaft 22. Upper shaft second end 32 is coupled to steering wheel rim 20, and steering shaft 12 is rotatable about axis ‘A’ and is configured to transmit torque from wheel 20 to vehicle road wheels (not shown). Alternatively, upper shaft 24 may be slidingly disposed about lower shaft 22.

Column jacket 14 extends along axis ‘A’ and includes a lower jacket 34 and an upper jacket 36. Jacket 14 surrounds and supports shaft 12 via upper bearings 38 and lower bearings 40 disposed between shaft 12 and jacket 14. In the exemplary embodiment, jacket 14 extends coaxially with steering shaft 12, which is rotatably connected to upper jacket 36. Lower jacket 34 is coupled to a stationary part of the vehicle such as the vehicle chassis (not shown), and upper jacket 36 is telescopically and slidingly disposed at least partially within lower jacket 34. Alternatively, upper jacket 36 may be slidingly disposed about lower jacket 34.

Hub support 16 extends along axis ‘A’ and includes a lower hub support 42 and an upper hub support 44 surrounded by steering shaft 12. In the exemplary embodiment, hub support 16 extends coaxially with steering shaft 12 and column jacket 14. Lower hub support 42 is coupled to a stationary part of the vehicle such as the vehicle chassis, and upper hub support 44 is telescopically and slidingly disposed at least partially about lower hub support 42. As such, upper hub support 44 includes a first end 46 disposed about lower hub support 42, and a second end 48 coupled to stationary hub 18. A bearing 50 is disposed between stationary hub 18 and upper shaft 24 to facilitate rotation of shaft 12 about axis ‘A’. Alternatively, upper hub support 44 may be slidingly disposed within lower hub support 42. In some embodiments, hub support 16 may be pivotally mounted to the vehicle to facilitate raking movement of steering column assembly 10.

In the illustrated embodiment, stationary hub 18 is coupled to upper hub support second end 48. Because lower and upper hub supports 42, 44 are fixed from rotation about axis ‘A’, stationary hub 18 is fixed from rotation about axis ‘A’. However, due to telescoping movement, upper hub support 44 and thus stationary hub 18 may be translated a predefined distance along axis 'A'. As such, stationary hub 18 is non-rotatably attached to telescoping hub support 16.

One or more switches 52 may be coupled to stationary hub 18 to provide control of various functions of the vehicle. For example, switches 52 may be a wiper control stalk, a vehicle light control stalk, a turn signal stalk, a power telescope/rake switch, or the like. Switches may be in electrical and/or signal communication with a vehicle controller 54 via a conduit 56 (e.g., electrical wire, optical, etc.) or other mode (e.g., wireless). As used herein, the term controller refers to an application specific integrated circuit (ASIC), an electronic circuit, a processor (shared, dedicated, or group) and memory that executes one or more software or firmware programs, a combinational logic circuit, and/or other suitable components that provide the described functionality.

In the illustrated embodiment, conduit 56 is disposed within hub support 16, which provides a direct pathway for communication with switches 52. A cord reel 58 may be provided to take up slack of conduit 56 during telescoping movement of column assembly 10. Moreover, electrical devices (e.g., video screen, computer, device charger, etc.) may be disposed on or within stationary hub 18 and connected to conduit 56.

Figure 2:
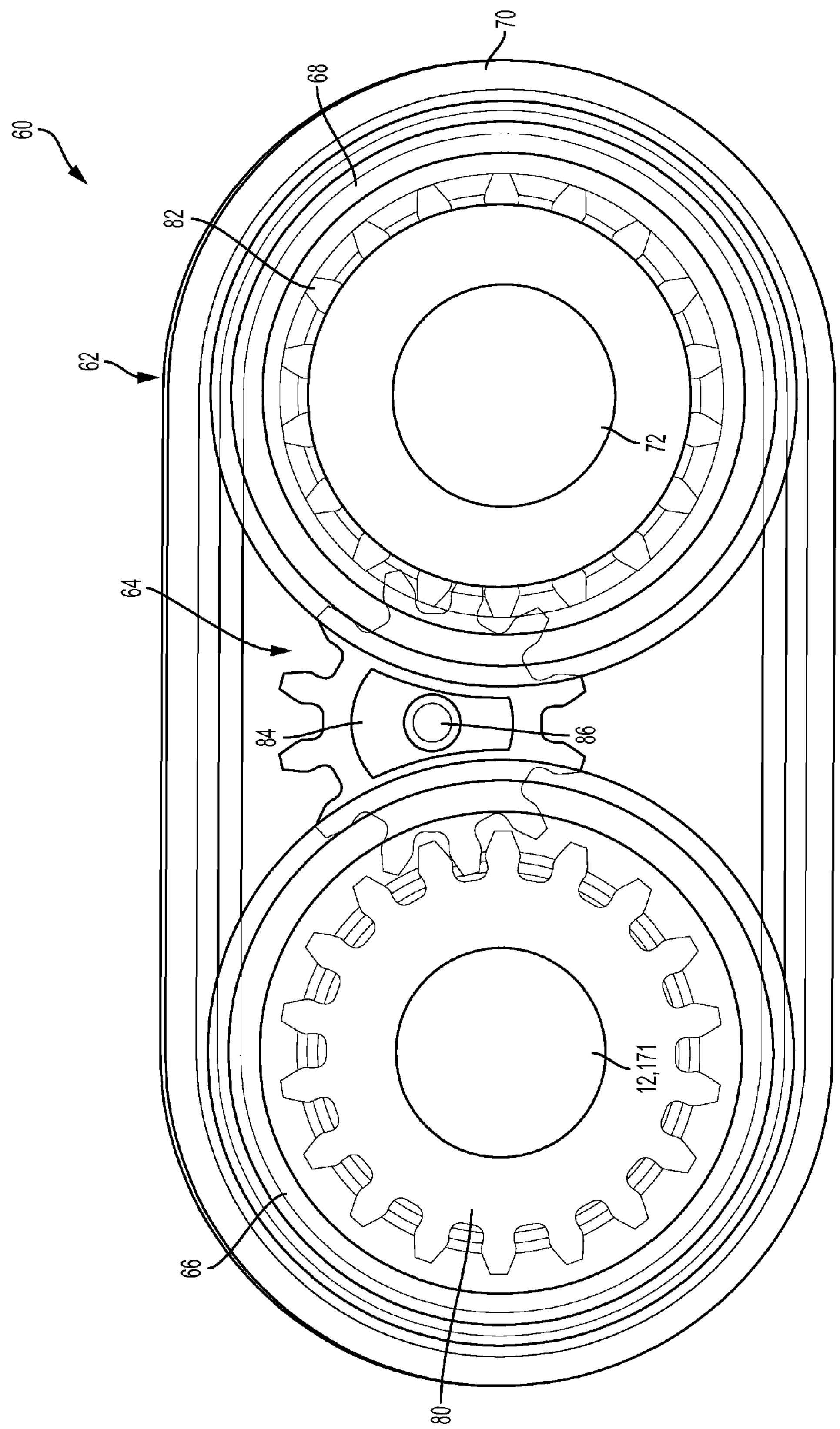
FIG. 2 is a plan view of a power transfer system of the invention.
Figure 3:
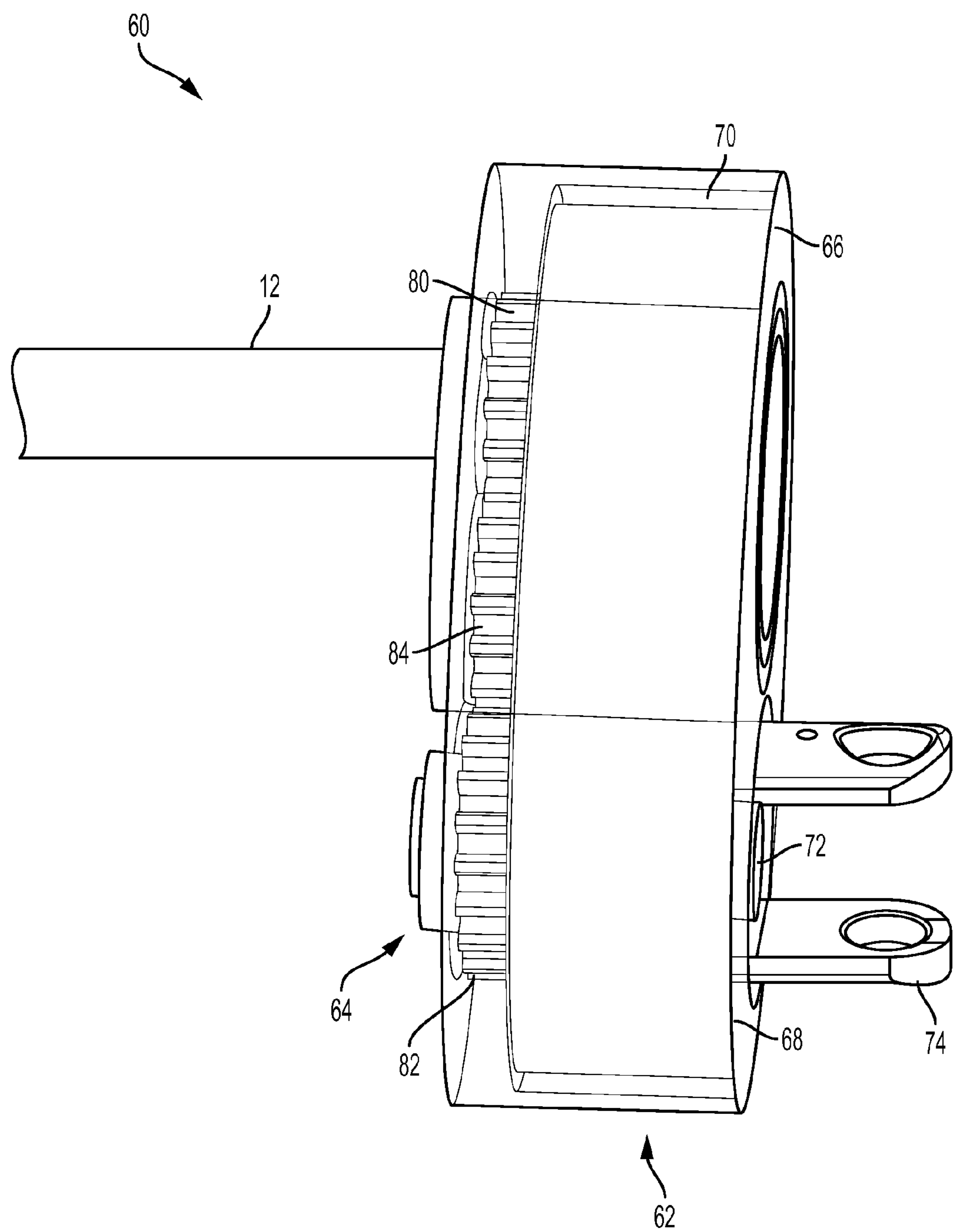
FIG. 3. is an elevation view of the power transfer system of FIG. 2.

With reference to FIGS. 1-3, steering column assembly 10 includes an eccentric power take-off or power transfer system 60 that generally includes a primary drive system 62 and a secondary drive system 64. Torque and rotation by the driver to steering shaft 12 may be maintained by secondary drive system 64 in the event of failure of primary drive system 62, such as due to belt or chain breakage. Accordingly, primary drive system will be substantially inactive and unable to transfer the torque.

In the exemplary embodiment, primary drive system 62 generally includes a drive pulley 66, a driven pulley 68, and a toothed belt 70. Drive pulley 66 is coupled to shaft 12 and transmits torque to driven pulley 68 via belt 70 coupled therebetween. In alternative embodiments, belt 70 may be a chain or other continuous loop flexible element. Driven pulley 68 is coupled to an output shaft 72 and transmits torque to an intermediate shaft (not shown), for example, via a yoke 74 coupled to shaft 72 (see FIG. 3).

In the exemplary embodiment, secondary drive system 64 generally includes a drive overload gear 80, a driven overload gear 82, and an idler gear 84. Drive overload gear 80 is coupled to steering shaft 12 and/or drive pulley 66, and driven overload gear 82 is coupled to shaft 72 and/or driven pulley 68.

Idler gear 84 is supported for rotation on a shaft 86, which is rotatably coupled to a housing (not shown) or other portion of system 60. Idler gear 84 is disposed between and meshingly engages drive overload gear 80 and driven overload gear 82. However, the teeth of idler gear 84 are loosely meshed with the teeth of gears 80, 82. As such, gears 80, 82, 84 are not tightly meshed and rotate with a predetermined small clearance in the tooth mesh. This enables belt 70 to be adjusted tightly to provide lash-free rotation without conflict from gears 80, 82, 84. As such, in the event that belt 70 is damaged (e.g., broken, worn teeth) and primary drive system 62 is substantially disabled or inoperable, idler gear 84 transfers torque and rotation from drive overload gear 80 to driven overload gear 82.

Figure 4:
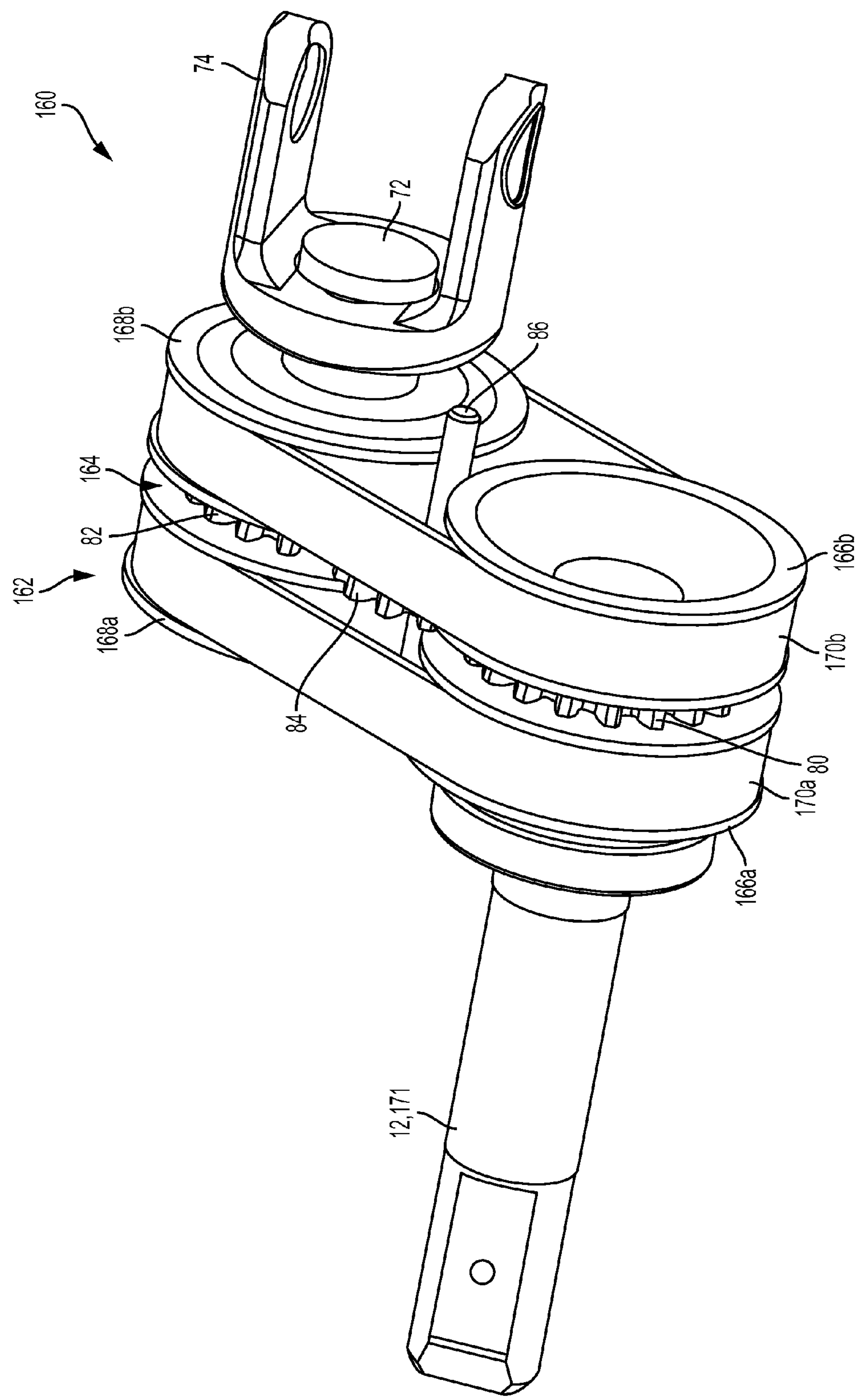
FIG. 4 illustrates an alternative embodiment of a power transfer system.

FIG. 4 illustrates a dual-belt eccentric power take-off or power transfer system 160 that is similar to system 60 and like reference numerals indicate like parts. System 160 generally includes a primary drive system 162 and a secondary drive system 164. Torque and rotation by the driver to steering shaft 12 may be maintained by secondary drive system 164 in the event of failure of primary drive system 162, such as due to belt or chain breakage. Accordingly, primary drive system will be substantially inactive and unable to transfer the torque.

In the exemplary embodiment, primary drive system 162 includes a dual belt system that generally includes drive pulleys 166*a* and 166*b*, driven pulleys 168*a* and 168*b*, and belts 170*a* and 170*b*. Drive pulleys 166*a*, 166*b* are coupled to an input shaft 171 and transmit torque to respective driven pulleys 168*a*, 168*b* via respective belts 170*a*, 170*b*. Alternatively, drive pulleys 166*a*, 166*b* may be coupled directly to shaft 12 rather than through input shaft 171. Driven pulleys 168*a*, 168*b* are coupled to shaft 72 and transmit torque to the intermediate shaft via yoke 74.

In the illustrated embodiment, secondary drive system 164 includes drive overload gear 80, driven overload gear 82, and idler gear 84. Drive overload gear 80 is coupled to input shaft 171 (or steering shaft 12) and/or one or both drive pulleys 166*a*, 166*b*. Driven overload gear 82 is coupled to shaft 72 and/or one or both driven pulleys 168*a*, 168*b*.

Idler gear 84 is supported for rotation on shaft 86, which is rotatably coupled to a housing (not shown) or other portion of system 160. Idler gear 84 is disposed between and meshingly engages drive overload gear 80 and driven overload gear 82. However, the teeth of idler gear 84 are loosely meshed with the teeth of gears 80, 82. As such, gears 80, 82, 84 are not tightly meshed and rotate with a predetermined small clearance in the tooth mesh. This enables belts 170*a*, 170*b* to be adjusted tightly to provide lash-free rotation without conflict from gears 80, 82, 84. As such, in the event that belts 170*a*, 170*b* are damaged (e.g., broken, worn teeth) and primary drive system 162 is inoperable, idler gear 84 transfers torque and rotation from drive overload gear 80 to driven overload gear 82.

A method of assembling power take-off system 60, 160 includes coupling drive pulley 66, 166*a*, 166*b* and drive overload gear 80 to shaft 12, 171, coupling driven pulley 68, 168*a*, 168*b* and driven overload gear 82 to shaft 72, and rotatably coupling the drive pulley and driven pulley with belt 70, 170*a*, 170*b*. Idler gear 84 is rotatably disposed between and meshingly engages the drive pulley and the driven pulley to transfer torque and rotation therebetween.

Described herein are systems and methods providing an overload protection system for a power transfer system of a steering column assembly. The power transfer system includes a primary drive system to transfer steering motion through a drive pulley, a driven pulley, and a belt. A secondary drive system transfers steering motion through a drive overload gear, a driven overload gear, and an idler gear disposed therebetween. The idler gear is loosely meshed between the drive/driven overload gears. As such, the secondary drive system transfers steering motion in the steering column assembly in the event the primary drive system is disabled or inoperable.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. An eccentric power transfer system for a steering column assembly, the system comprising:

a primary drive system configured to transfer a torque applied to the steering column assembly to a vehicle steering system; and a secondary drive system in parallel with the primary drive system and configured to transfer the torque applied to the steering column assembly when the primary drive system is inactive and substantially unable to transfer the torque, the primary drive system further comprising:

a drive pulley configured to couple to a steering shaft of the steering column assembly;

a driven pulley configured to couple to an output shaft; and a drive belt engaging the drive pulley and the driven pulley to transfer a torque therebetween.

2. The system of claim 1, wherein the drive pulley comprises a first drive pulley and a second drive pulley, the driven pulley comprises a first driven pulley and a second driven pulley, and the drive belt comprises a first drive belt and a second drive belt.

3. The system of claim 1, further comprising a yoke coupled to the output shaft, the yoke configured to couple to an intermediate shaft.

4. An eccentric power transfer system for a steering column assembly, the system comprising:

a primary drive system configured to transfer a torque applied to the steering column assembly to a vehicle steering system; and a secondary drive system configured to transfer the torque applied to the steering column assembly when the primary drive system is inactive and substantially unable to transfer the torque, the secondary drive system further compromising:

a drive overload gear configured to couple to a steering shaft of the steering column assembly;

a driven overload gear configured to couple to an output shaft; and an idler gear disposed between and meshingly engaged with the drive overload gear and the driven overload gear to transfer a torque therebetween.

5. The system of claim 4, wherein the idler gear is loosely meshed to the drive overload gear and the driven overload gear.

6. A steering column assembly for a vehicle, the assembly comprising:

a steering shaft;

a primary drive system eccentrically coupled to the steering shaft and configured to transfer a torque applied to the steering shaft to a vehicle steering system; and a secondary drive system in parallel with the primary drive system and coupled to the steering shaft and configured to transfer the torque applied to the steering shaft if the primary drive system is inactive and substantially unable to transfer the torque, the primary drive system further comprising:

a drive pulley configured to couple to the steering shaft;

a driven pulley configured to couple to an output shaft; and a drive belt engaging the drive pulley and the driven pulley to transfer a torque therebetween.

7. The assembly of claim 6, wherein the drive pulley comprises a first drive pulley and a second drive pulley, the driven pulley comprises a first driven pulley and a second driven pulley, and the drive belt comprises a first drive belt and a second drive belt.

8. The assembly of claim 6, further comprising a yoke coupled to the output shaft, the yoke configured to couple to an intermediate shaft.

9. A steering column assembly for a vehicle, the assembly comprising:

a steering shaft;

a primary drive system eccentrically coupled to the steering shaft and configured to transfer a torque applied to the steering shaft to a vehicle steering system; and a secondary drive system coupled to the steering shaft and configured to transfer the torque applied to the steering shaft if the primary drive system is inactive and substantially unable to transfer the torque, the secondary drive system further compromising:

a drive overload gear configured to couple to the steering shaft;

a driven overload gear configured to couple to an output shaft; and an idler gear disposed between and meshingly engaged with the drive overload gear and the driven overload gear to transfer a torque therebetween.

10. The assembly of claim 9, wherein the idler gear is loosely meshed to the drive overload gear and the driven overload gear.

11. A steering column assembly for a vehicle, the assembly comprising:

a steering shaft;

a primary drive system eccentrically coupled to the steering shaft and configured to transfer a torque applied to the steering shaft to a vehicle steering system; and a secondary drive system in parallel with the primary drive system and coupled to the steering shaft and configured to transfer the torque applied to the steering shaft if the primary drive system is inactive and substantially unable to transfer the torque, the steering shaft is rotatable about an axis and is configured to couple to a steering wheel rim, the steering column assembly further comprising:

a hub support configured to be non-rotatably coupled to a support structure of the vehicle; and a stationary hub coupled to the hub support, the steering wheel rim rotatable relative to the stationary hub.

12. The assembly of claim 11, wherein the hub support is disposed about the axis and is concentric with the steering shaft.

13. The assembly of claim 11, wherein the steering shaft includes a first shaft slidingly disposed within a second shaft, the steering shaft configured for telescopic movement.

14. The assembly of claim 11, wherein the hub support includes a first hub support slidingly disposed within a second hub support, the hub support configured for telescopic movement.

15. A method of assembling a steering column assembly for a vehicle, the method comprising:

providing a steering shaft rotatable about an axis;

eccentrically coupling a primary drive system to the steering shaft to transfer a torque applied to the steering shaft;

coupling a secondary drive system to the steering shaft to transfer the torque applied to the steering shaft if the primary drive system is inactive and substantially unable to transfer the torque, wherein coupling a primary drive system comprises:

coupling a drive pulley to the steering shaft;
coupling a driven pulley to an output shaft; and
coupling a drive belt to the drive pulley and the driven pulley to transfer a torque therebetween; and coupling a secondary drive system comprises:
coupling a drive overload gear to at least one of the steering shaft and the drive pulley;
coupling a driven overload gear to at least one of the output shaft and the driven pulley; and
meshingly disposing an idler gear between the drive overload gear and the driven overload gear to transfer a torque therebetween.

16. The method of claim 15, further comprising:
coupling a steering wheel rim to the steering shaft;
non-rotatably coupling a hub support to a support structure of the vehicle; and
coupling a stationary hub to the hub support, the steering wheel rim rotatable relative to the stationary hub.

* * * * *